United States Patent
Zhu

(10) Patent No.: US 11,917,660 B2
(45) Date of Patent: Feb. 27, 2024

(54) METHOD FOR CONTROL INSTRUCTION TRANSMISSION, BASE STATION, AND TERMINAL

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 472 days.

(21) Appl. No.: 17/276,817

(22) PCT Filed: Sep. 20, 2018

(86) PCT No.: PCT/CN2018/106775
§ 371 (c)(1),
(2) Date: Mar. 16, 2021

(87) PCT Pub. No.: WO2020/056687
PCT Pub. Date: Mar. 26, 2020

(65) Prior Publication Data
US 2021/0274504 A1 Sep. 2, 2021

(51) Int. Cl.
*H04W 72/53* (2023.01)
*H04W 72/0446* (2023.01)
*H04W 72/0453* (2023.01)
*H04W 72/23* (2023.01)

(52) U.S. Cl.
CPC ....... *H04W 72/53* (2023.01); *H04W 72/0446* (2013.01); *H04W 72/0453* (2013.01); *H04W 72/23* (2023.01)

(58) Field of Classification Search
CPC ............. H04W 72/23; H04W 72/0446; H04W 72/0453
USPC .................................. 370/329, 400, 493, 395
See application file for complete search history.

(56) References Cited

U.S. PATENT DOCUMENTS

2016/0157218 A1* 6/2016 Nam ..................... H04B 7/0632
370/329
2020/0296596 A1* 9/2020 Clegg ................... H04W 24/08

FOREIGN PATENT DOCUMENTS

CN 108024310 A 5/2018

OTHER PUBLICATIONS

International Search Report in Application No. PCT/CN2018/106775, dated May 29, 2019.

* cited by examiner

*Primary Examiner* — Dang T Ton
(74) *Attorney, Agent, or Firm* — Syncoda LLC; Feng Ma

(57) ABSTRACT

A control instruction transmission method includes: in response to an unlicensed channel being occupied successfully, in which the first control instruction carries indication information configured to indicate a first detection parameter at least including a resource location on the unlicensed channel for the base station sending a control instruction; and sending a second control instruction on the resource location.

18 Claims, 7 Drawing Sheets

METHOD FOR CONTROL INSTRUCTION TRANSMISSION, BASE STATION, AND TERMINAL

CROSS-REFERENCE TO RELATED APPLICATIONS

The present application is a national stage of International Application No. PCT/CN2018/106775 filed on Sep. 20, 2018, the disclosure of which is hereby incorporated by reference in its entirety.

TECHNICAL FIELD

The present disclosure relates to a field of communication technology, in particular, to a method for control instruction transmission, a base station, user equipment (e.g., a terminal) and a storage medium.

BACKGROUND

Licensed channels are usually used for transmission in wireless communication system. However, with the emergence of a new generation of Internet applications, relatively high requirements for wireless communication technology drive evolutions of wireless communication system, and the licensed channel is unable to meet transmission requirement. Therefore, application of unlicensed channels through LBT (Listen Before Talk) mechanism is proposed. Transmission between a base station and a terminal can be achieved through an unlicensed channel, such as sending downlink control instructions.

In related art, when a base station sends a control instruction to a terminal through an unlicensed channel, a resource location of the control instruction to be transmitted in an unlicensed channel shall be configured for the terminal first, and the terminal may detect a detection cycle of the control instruction. Moreover, the base station detects a status of the unlicensed channel. The base station successfully occupies the unlicensed channel when the unlicensed channel is idle, and the base station sends a control instruction to the terminal at the configured resource location. The terminal detects the control instruction based on the detection cycle on the resource location.

SUMMARY

A method for control instruction transmission, a base station, a terminal and a storage medium are provided, to solve related technical problems. The technical solutions are described as follows.

According to a first aspect of embodiments of the present disclosure, a method for control instruction transmission is provided. The method is applied to a base station, and includes: sending a first control instruction to a terminal in response to an unlicensed channel being occupied successfully, in which the first control instruction carries indication information configured to indicate a first detection parameter at least including a resource location on the unlicensed channel for the base station sending a control instruction; and sending a second control instruction on the resource location.

In a possible implementation, the indication information is an index identification, and the method also includes: sending a detection parameter index table to the terminal, in which each index identification corresponds to a detection parameter in the detection parameter index table, and the detection parameter index table is configured to query the detection parameter corresponding to the index identification.

In another possible implementation, the indication information includes the first detection parameter.

In another possible implementation, the indication information is in an information domain at a fixed position of the first control instruction, and a bit length of the indication information is fixed or determined by configuration.

In another possible implementation, an effective time window of the first detection parameter is carried in the first control instruction or determined by configuration.

In another possible implementation, the method further includes: sending identification information of the first control instruction to the terminal.

In another possible implementation, the method further includes: sending a second detection parameter to the terminal, in which the second detection parameter at least includes a resource location for the base station sending the first control instruction.

In another possible implementation, the method further includes: receiving a detectability of the terminal; and determining the first detection parameter according to the detectability of the terminal, in which the first detection parameter includes at least one of the resource location, an initial detection time point, a detection cycle, detection times of a time period of occupying the unlicensed channel, a control instruction format and a polymerization level.

According to a second aspect of embodiments of the present disclosure, a method for control command transmission is provided. The method is applied to a terminal and includes: receiving a first control instruction sent by a base station in response to an unlicensed channel being occupied successfully, in which the first control instruction carries indication information configured to indicate a first detection parameter, the first detection parameters at least includes a resource location on the unlicensed channel for the base station sending a control instruction; determining the first detection parameter according to the indication information; and detecting a second control instruction sent by the base station on the resource location according to the first detection parameter.

In a possible implementation, the indication information is an index identification, and determining the first detection parameter according to the indication information includes: querying a detection parameter index table according to the index identification, and determining the first detection parameter corresponding to the index identification, in which each index identification corresponds to a detection parameter in the detection parameter index table.

In another possible implementation, the indication information includes the first detection parameter, and determining the first detection parameter according to the indication information includes: determining the first detection parameter included in the indication information.

In another possible implementation, the indication information is in an information domain at a fixed position of the first control instruction, and a bit length of indication information is fixed or determined by configuration.

In another possible implementation, an effective time window of the first detection parameter is carried in the first control instruction or determined by configuration; and detecting the second control instruction sent by the base station on the resource location according to the first detection parameter includes: detecting the second control instruction according to the first detection parameter within the effective time window of the first detection parameter.

In another possible implementation, determining the first detection parameter according to the indication information includes: determining the first detection parameter according to the indication information in response to identification information carried in the first control instruction matched with a stored identification information.

In another possible implementation, receiving the first control instruction sent by the base station in response to the unlicensed channel being occupied successfully includes: determining a second detection parameter, in which the second detection parameter at least include a resource location of the first control instruction sent by the base station; detecting the first control instruction according to the second detection parameter.

In another possible implementation, the method further includes: sending a detectability of the terminal to the base station, in which the detectability is configured to determine the first detection parameter.

According to a third aspect of embodiments of the present disclosure, a base station is provided. The base station includes: a first sending module, configured to send a first control instruction to a terminal in response to an unlicensed channel being occupied successfully, in which the first control instruction carries indication information configured to indicate a first detection parameter at least including a resource location on the unlicensed channel for the base station sending a control instruction; and a second sending module, configured to send a second control instruction on the resource location.

In a possible implementation, the indication information is an index identification, and the base station also includes: a third sending module, configured to send a detection parameter index table to the terminal, in which each index identification corresponds to a detection parameter in the detection parameter index table, and the detection parameter index table is configured to query the detection parameter corresponding to the index identification.

In another possible implementation, the indication information includes the first detection parameter.

In another possible implementation, the indication information is in an information domain at a fixed position of the first control instruction, and a bit length of the indication information is fixed or determined by configuration.

In another implementation, an effective time window of the first detection parameter is carried in the first control instruction or determined by configuration.

In another possible implementation, the base station includes: a fourth sending module, configured to send identification information of the first control instruction to the terminal.

In another possible implementation, the base station includes: a fifth sending module, configured to send a second detection parameter to the terminal, in which the second detection parameter at least includes a resource location for the base station sending the first control instruction.

In another possible implementation way, the base station includes: a receiving module, configured to receive a detectability of the terminal; and a determining module, configured to determine the first detection parameter according to the detectability of the terminal, in which the first detection parameter includes at least one of the resource location, an initial detection time point, a detection cycle, detection times of a time period of occupying the unlicensed channel, a control instruction format and a polymerization level.

According to a fourth aspect of embodiments of the present disclosure, a terminal is provided. The terminal includes: a receiving module, configured to receive a first control instruction sent by a base station in response to an unlicensed channel being occupied successfully, in which the first control instruction carries indication information configured to indicate a first detection parameter, the first detection parameters at least includes a resource location on the unlicensed channel for the base station sending a control instruction; a first determining module, configured to determine the first detection parameter according to the indication information; and a detection module, configured to detect a second control instruction sent by the base station on the resource location according to the first detection parameter.

In a possible implementation, the indication information is an index identification, and the first determining module is configured to query a detection parameter index table according to the index identification, and to determine the first detection parameter corresponding to the index identification, in which each index identification corresponds to a detection parameter in the detection parameter index table.

In another possible implementation, the indication information includes the first detection parameter and the first determining module is configured to determine the first detection parameter included in the indication information.

In another possible implementation, the indication information is in an information domain at a fixed position of the first control instruction, and a bit length of indication information is fixed or determined by configuration.

In another possible implementation, an effective time window of the first detection parameter is carried in the first control instruction or determined by configuration, and the detection module is configured to detect the second control instruction according to the first detection parameter in the effective time window of the first detection parameter.

In another possible implementation, the receiving module is configured to determine the first detection parameter according to the indication information in response to identification information carried in the first control instruction matched with a stored identification information.

In another possible implementation, the terminal includes: a second determining module, configured to determine a second detection parameter, in which the second detection parameter at least include a resource location of the first control instruction sent by the base station; in which the detection module is further configured to detect the first control instruction according to the second detection parameter.

In another possible implementation, the terminal includes: a sending module, configured to send a detectability of the terminal to the base station, in which the detectability is configured to determine the first detection parameter.

According to a fifth aspect of embodiments of the present disclosure, a base station is provided. The base station includes: a processor; memory configured to store instructions executable by the processor. The processor is configured to: send a first control instruction to a terminal in response to an unlicensed channel being occupied successfully, in which the first control instruction carries indication information configured to indicate a first detection parameter at least including a resource location on the unlicensed channel for the base station sending a control instruction; and send a second control instruction on the resource location.

According to a sixth aspect of embodiments of the present disclosure, a terminal is provided. The terminal includes: a processor; memory configured to store instructions executable by the processor. The processor is configured to: receive a first control instruction sent by a base station in response to an unlicensed channel being occupied successfully, in which the first control instruction carries indication information configured to indicate a first detection parameter, the first detection parameters at least includes a resource location on the unlicensed channel for the base station sending a control instruction; determine the first detection parameter according to the indication information; and detect a second control instruction sent by the base station on the resource location according to the first detection parameter.

According to a seventh aspect of embodiments of the present disclosure, a computer readable storage medium is provided. At least one instruction is stored on the storage medium, and the instruction is loaded and performed by the processor to implement operations performed in the method for control instruction detection as described in the first aspect.

According to an eighth aspect of embodiments of the present disclosure, a computer readable storage medium is provided. At least one instruction is stored on the storage medium, and the instruction is loaded and performed by the processor to implement operations performed in the method for control instruction detection as described in the second aspect.

With the method, the base station, the terminal and the storage medium provided in embodiments of the present disclosure, a first control instruction is sent to a terminal in response to an unlicensed channel being occupied successfully, in which the first control instruction carries indication information configured to indicate a first detection parameter. The base station sends a second control instruction, and the terminal may receive the first control instruction and determine the first detection parameter according to the indication information, and then adjust a detection manner according to the first detection parameter to detect the second control instruction. In embodiments of the present disclosure, when the base station successfully occupies the channel, the first control instruction may be sent to inform the terminal, and the terminal may be indicated to detect the control instruction sent through the unlicensed channel according to the first detection parameter, such that the terminal may obtain the situation of the base station occupying the unlicensed channel and conduct detection in time, and the base station may flexibly adjust the detection of the terminal according to the situation of terminal such as business situation when occupying the unlicensed channel, which ensures that the time period of the terminal detecting the control instruction is aligned with the time period of the base station occupying the unlicensed channel, thereby avoiding terminal control instruction failure due to the time period of the terminal detecting control instruction unaligned with the time period of the base station occupying the unlicensed channel or loss of the control instruction sent by the base station.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

To make the purpose, technical solution and advantages of the present disclosure more clear, the present disclosure is further described in detail with reference to the embodiments and the appended drawings. The exemplary embodiments of the present disclosure and the descriptions thereof are configured to explain the present disclosure, and do not constitute the limitation on the present disclosure.

A method for control instruction transmission, a base station, a terminal and a storage medium are provided in embodiments of the present disclosure, and the present disclosure will be described in detail as follows with reference to the accompany drawings.

Figure 1:
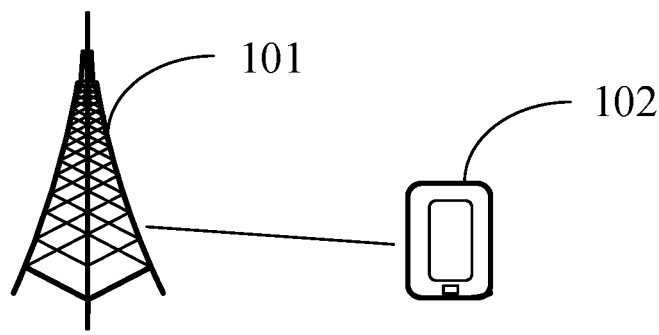
FIG. 1 is a structure diagram illustrating a communication system according to an example embodiment.

FIG. 1 is a structure diagram illustrating a communication system according to an example embodiment. As illustrated in FIG. 1, the communication system includes a base station 101 and a terminal 102, the base station 101 and the terminal 102 are connected through a communication network.

In the communication process, the base station 101 may send a downlink control instruction to the terminal 102, and the terminal 102 detects the downlink control instruction, such that the base station 101 may achieve a control on the terminal 102.

Moreover, the base station 101 may send the downlink control instruction to the terminal 102 at a resource location on a licensed channel, and the terminal 102 may detect the instruction on the resource location.

Alternatively, in some situations, the base station 101 may send the downlink control instruction on the resource location via an unlicensed channel, and the terminal 102 may detect the instruction on the resource location. For convenience of detection of the terminal 102, when the base station 101 successfully occupies the unlicensed channel, a control instruction is sent to the terminal 102, in which the terminal 102 determines a detection parameter according to the indication information in the control instruction, so as to detect the downlink control instruction according to the detection parameter.

Figure 2:
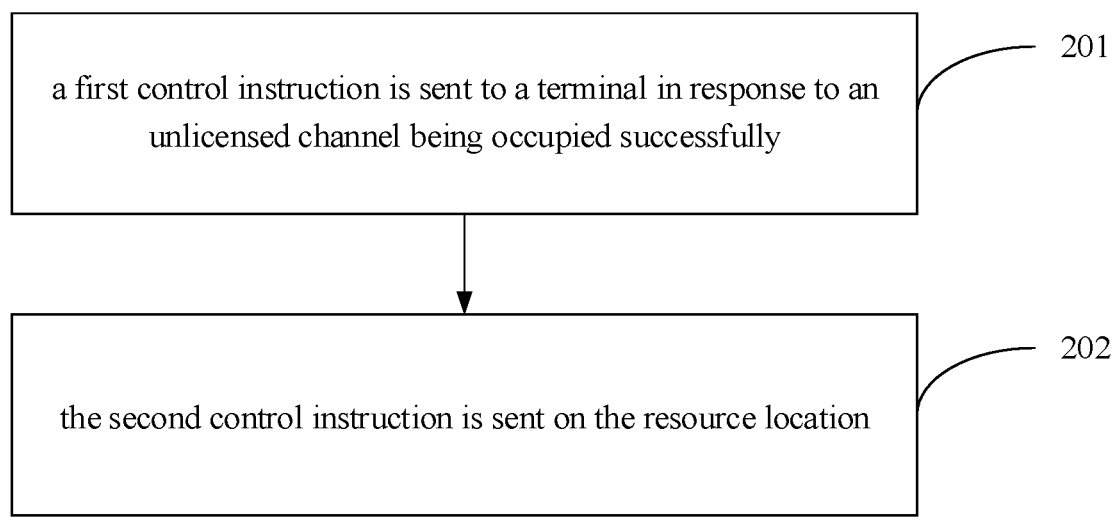
FIG. 2 is a flowchart illustrating a method for control instruction transmission according to an example embodiment.

FIG. 2 is a flowchart illustrating a method for control instruction transmission according to an example embodiment. The method is applied to a base station. As illustrated in FIG. 2, the method includes followings.

At block 201, a first control instruction is sent to a terminal in response to an unlicensed channel being occupied successfully.

The first control instruction carries indication information configured to indicate a first detection parameter, and the first detection parameter at least includes a resource location on the unlicensed channel for the base station sending a control instruction.

At block 202, the second control instruction is sent on the resource location.

With the method proposed in embodiments of the present disclosure, a first control instruction is sent to a terminal in response to an unlicensed channel being occupied successfully, in which the first control instruction carries indication information configured to indicate a first detection parameter. The base station sends a second control instruction, and the terminal may receive the first control instruction and determine the first detection parameter according to the indication information, and then adjust a detection manner according to the first detection parameter to detect the second control instruction. In embodiments of the present disclosure, when the base station successfully occupies the channel, the first control instruction may be sent to inform the terminal, and the terminal may be indicated to detect the control instruction sent through the unlicensed channel according to the first detection parameter, such that the terminal may obtain the situation of the base station occupying the unlicensed channel and conduct detection in time, and the base station may flexibly adjust the detection of the terminal according to the situation of terminal such as business situation when occupying the unlicensed channel, which ensures that the time period of the terminal detecting the control instruction is aligned with the time period of the base station occupying the unlicensed channel, thereby avoiding terminal control instruction failure due to the time period of the terminal detecting control instruction unaligned with the time period of the base station occupying the unlicensed channel or loss of the control instruction sent by the base station.

In a possible implementation, the indication information is an index identification, and the method also includes: sending a detection parameter index table to the terminal, in which each index identification corresponds to a detection parameter in the detection parameter index table, and the detection parameter index table is configured to query the detection parameter corresponding to the index identification.

In another possible implementation, the indication information includes the first detection parameter.

In another possible implementation, the indication information is in an information domain at a fixed position of the first control instruction, and a bit length of the indication information is fixed or determined by configuration.

In another implementation, an effective time window of the first detection parameter is carried in the first control instruction or determined by configuration.

In another possible implementation, the method further includes: sending identification information of the first control instruction to the terminal.

In another possible implementation, the method further includes: sending a second detection parameter to the terminal, in which the second detection parameter at least includes a resource location for the base station sending the first control instruction.

In another possible implementation, the method further includes: receiving a detectability of the terminal; and determining the first detection parameter according to the detectability of the terminal, in which the first detection parameter includes at least one of the resource location, an initial detection time point, a detection cycle, detection times of a time period of occupying the unlicensed channel, a control instruction format and a polymerization level.

Figure 3:
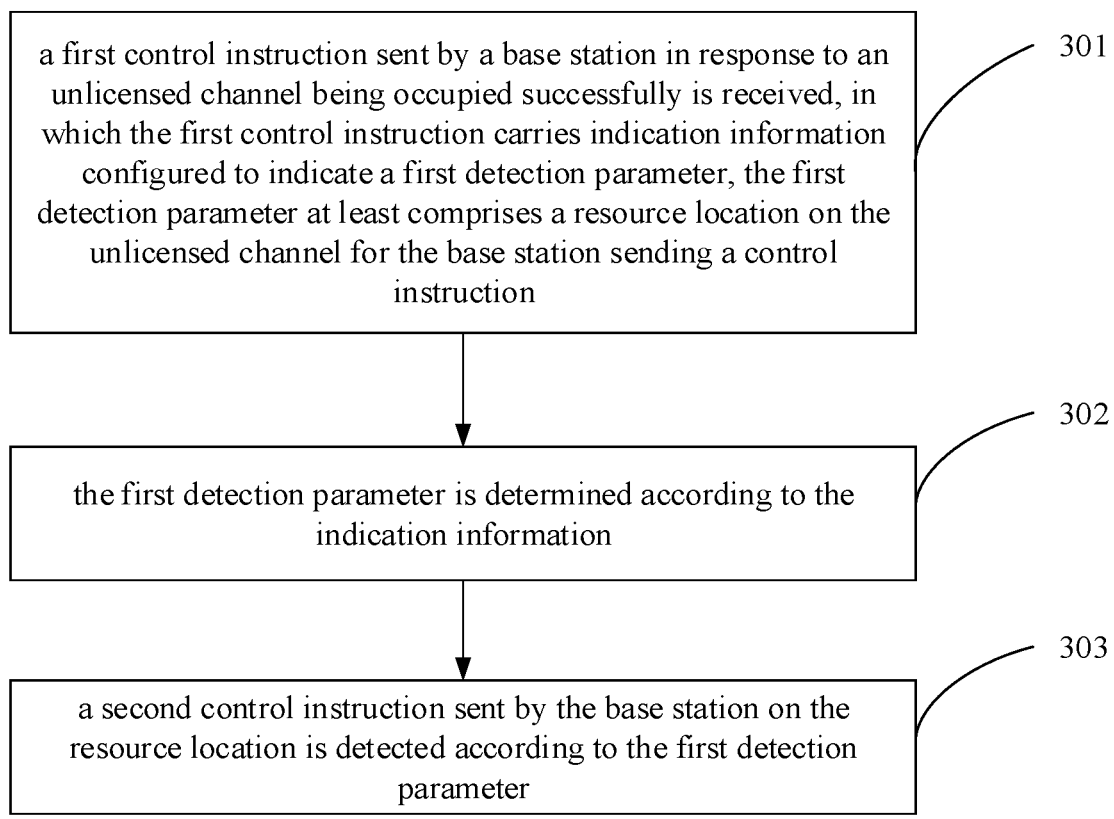
FIG. 3 is a flowchart illustrating a method for control instruction transmission according to an example embodiment.

FIG. 3 is a flowchart illustrating a method for control instruction transmission according to an example embodiment, applied to a terminal. As illustrated in FIG. 3, the method includes followings.

At block 301, a first control instruction sent by a base station in response to an unlicensed channel being occupied successfully is received, in which the first control instruction carries indication information configured to indicate a first detection parameter, the first detection parameter at least includes a resource location on the unlicensed channel for the base station sending a control instruction.

At block 302, the first detection parameter is determined according to the indication information.

At block 303, a second control instruction sent by the base station on the resource location is detected according to the first detection parameter.

With the method proposed in embodiments of the present disclosure, a first control instruction is sent to a terminal in response to an unlicensed channel being occupied successfully, in which the first control instruction carries indication information configured to indicate a first detection parameter. The base station sends a second control instruction, and the terminal may receive the first control instruction and determine the first detection parameter according to the indication information, and then adjust a detection manner according to the first detection parameter to detect the second control instruction. In embodiments of the present disclosure, when the base station successfully occupies the channel, the first control instruction may be sent to inform the terminal, and the terminal may be indicated to detect the control instruction sent through the unlicensed channel according to the first detection parameter, such that the terminal may obtain the situation of the base station occupying the unlicensed channel and conduct detection in time, and the base station may flexibly adjust the detection of the terminal according to the situation of terminal such as business situation when occupying the unlicensed channel, which ensures that the time period of the terminal detecting the control instruction is aligned with the time period of the base station occupying the unlicensed channel, thereby avoiding terminal control instruction failure due to the time period of the terminal detecting control instruction unaligned with the time period of the base station occupying the unlicensed channel or loss of the control instruction sent by the base station.

In a possible implementation, the indication information is an index identification, determining the first detection parameter according to the indication information includes: querying a detection parameter index table according to the index identification, and determining the first detection parameter corresponding to the index identification, in which each index identification corresponds to a detection parameter in the detection parameter index table. In a possible implementation, the indication information includes the first detection parameter, and determining the first detection parameter according to the indication information includes: determining the first detection parameter included in the indication information.

In another possible implementation, the indication information is in an information domain at a fixed position of the first control instruction, and a bit length of indication information is fixed or determined by configuration.

In another implementation, an effective time window of the first detection parameter is carried in the first control instruction or determined by configuration; and detecting the second control instruction sent by the base station on the resource location according to the first detection parameter includes: detecting the second control instruction according to the first detection parameter within the effective time window of the first detection parameter.

In another possible implementation, determining the first detection parameter according to the indication information includes: determining the first detection parameter according to the indication information in response to identification information carried in the first control instruction matched with a stored identification information. In another possible implementation, the method further includes: receiving the first control instruction sent by the base station in response to the unlicensed channel being occupied successfully includes: determining a second detection parameter, in which the second detection parameter at least include a resource location of the first control instruction sent by the base station; detecting the first control instruction according to the second detection parameter.

In another possible implementation, the method further includes: sending a detectability of the terminal to the base station, in which the detectability is configured to determine the first detection parameter.

Figure 4:
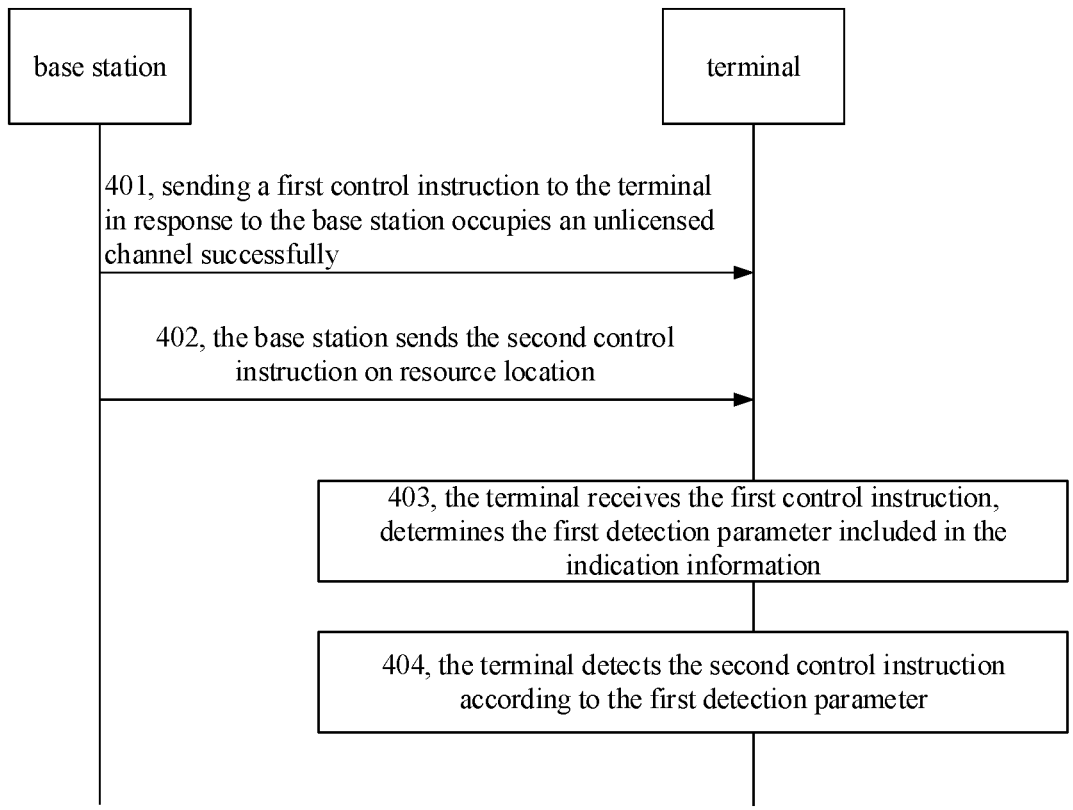
FIG. 4 is a flowchart illustrating a method for control instruction transmission according to an example embodiment.

FIG. 4 is a flowchart illustrating a method for control instruction transmission according to an example embodiment, interaction objects are a base station and a terminal. The embodiment is illustrated with an example of the indication information including a detection parameter. As illustrated in FIG. 4, the method is described as follows.

At block 401, a first control instruction is sent to a terminal in response to a base station occupies an unlicensed channel successfully.

Generally, the base station may be configured with a licensed channel, and the base station may send a control instruction to the terminal through the licensed channel. Optionally, the base station may also occupy an unlicensed channel and send the control instruction to the terminal through the unlicensed channel. A frequency band of the licensed channel is different from that of the unlicensed channel.

When the base station sends a control instruction to the terminal through the unlicensed channel, the status of the unlicensed channel may be detected. When the unlicensed channel is in an idle status, the base station successfully occupies the unlicensed channel, and the control instruction may be sent to the terminal at the configured resource location, and the terminal detects the control instruction on the resource location in a configured detection manner. However, the terminal may only perform the detection at the resource location with a pre-configured detection cycle, and cannot be aware of the base station successfully occupies the unlicensed channel or not, which may cause that the time period of the terminal detecting the control instruction may be not aligned with the time period of the base station occupying the unlicensed channel. That is, the above-discussed way of the terminal detecting the control instruction sent by the base station is difficult to be applied to the unlicensed channel.

For example, if the base station fails to occupy the unlicensed channel, even if the terminal detects the control instruction, the terminal is unable to perform the detection as the base station cannot transmit the control instruction, which causes unnecessary terminal detection overhead; alternatively, after the base station successfully occupies the unlicensed channel and sends the control instruction through the unlicensed channel, if the time period of the terminal performing the detection is not aligned with the time period of the base station occupying the unlicensed channel, the terminal may not detect the control instruction within the time period of the base station occupying the unlicensed channel, thereby leading to a loss of control signaling.

In embodiments of the present disclosure, in order to avoid the above situation and facilitate the terminal to obtain the situation of the base station occupying the unlicensed channel, when the base station determines that the unlicensed channel is idle and successfully occupies the unlicensed channel, the first control instruction is sent to the terminal, in which the first control instruction is used to indicate that the base station successfully occupies the unlicensed channel. After receiving the first control instruction, the terminal detects the control instruction sent by the base station on the unlicensed channel, thereby ensuring that the time period of the terminal detecting the control instruction is aligned with the time period of the base station occupying the unlicensed channel.

In a possible implementation, the base station and the terminal may pre-configure the resource location on the licensed channel and the detection cycle of the terminal detecting the resource location. In this way, the first control instruction may be sent by the base station to the terminal at the resource location on the licensed channel, and detected by the terminal on the resource location.

The first control instruction carries the indication information used to indicate the first detection parameter, and the first detection parameter is configured to detect the control instruction sent by the base station through the licensed channel. The terminal detects the control instruction sent by the base station through the unlicensed channel according to the first detection parameters. Therefore, the detection performed by the terminal may be adjusted dynamically in the way of sending the first control instruction, so that the terminal may detect the control instruction within the time period of the base station successfully occupying the unlicensed channel.

The embodiments of the present disclosure take the indication information including the first detection parameter as an example, that is, when the base station sends the first control instruction to the terminal, the first detection parameter to be detected is directly carried in the first control instruction, and the terminal directly obtains the first detection parameter in the first control instruction. The first detection parameter at least includes the resource location on the unlicensed channel for the base station sending the control instruction, and the terminal determines the resource location of the control instruction to be detected according to the first detection parameter.

The first detection parameter may be dynamically configured for the terminal by the base station, or may be configured by the base station according to the detectability of the terminal.

In a possible implementation, the terminal sends its detectability to the base station, and the base station receives the detectability and determines the first detection parameter according to the detectability. The first detection parameter not only include resource location but also include at least one of an initial detection time point, a detection cycle, detection times of a time period of occupying the unlicensed channel, a control instruction format and a polymerization level.

The detectability may be represented the maximum detection parameter of the terminal within a preset time duration, the preset time duration may be determined as 1 ms or is through negotiation between the base station and the terminal. Alternatively, the detectability may be represented by the detection frequency of the terminal or other parameters. The initial detection time point may be the time point when the base station successfully occupies the unlicensed channel, or a sum value of a reference time point and an offset, the reference time point may be the time point when the base station successfully occupies the unlicensed channel or other time point within the period of the base station occupying the unlicensed channel. The detection cycle and detection times within the period of the base station occupying the unlicensed channel may be determined according to the maximum detection times within the preset duration uploaded by the terminal. For example, the detection frequency of the terminal may be determined according to the maximum detection times of the terminal within the preset duration, then the detection cycle may be determined according to the detection frequency, and the detection times within the period may be determined according to the initial detection time point and a terminating detection time point within the period of the base station occupying the unlicensed channel, as well as the detection cycle of the terminal.

In the subsequent process, after the terminal obtains the first detection parameter, the control instruction sent by the base station may be detected from the initial detection time point within the period of the base station occupying the unlicensed channel according to the initial detection time point, the detection cycle and the detection times. The detection may be performed once in each detection cycle till times of detecting control instruction reaches the detection times.

In addition, the first detection parameter further includes the control instruction format or polymerization level, the control instruction format refers to the control instruction format which should be detected on the unlicensed channel by the terminal, that is, the control instruction in this format shall be detected by the terminal, while the control instruction not in this format shall not be detected by the terminal. Then, even if the base station sends control instructions in multiple formats, the terminal may be controlled to detect the control instructions in the corresponding formats without confusion by setting different control instruction formats in the first detection parameter. The polymerization level refers to the resource size occupied by the control instruction, which represents data volume of the control instruction. In addition, the first detection parameter may also include other parameters, which will not be described in detail herein.

With respect to the process of the terminal sending the detectability to the base station, the terminal may obtain its own detectability at regular intervals and send the same to the base station, alternatively, the terminal may obtain its detectability and send the same to the base station when receiving the instruction that the base station requires to report detectability.

At block 402, the second control instruction is sent by the base station on the resource location.

The embodiments of the present disclosure take the base station sending the second control instruction to the terminal as an example. When the base station successfully occupies the unlicensed channel, the second control instruction is sent at the resource location of the unlicensed channel, and then the second control instruction may be detected at the resource location by the terminal. The second control instruction is configured to control the terminal, which may be a dispatch instruction, a paging instruction, a power control instruction, or other instructions with control function, which will not be described in detail herein.

At block 403, the terminal receives the first control instruction and determines the first detection parameter included in the indication information.

As the first control instruction carries the indication information including the first detection parameter, when the terminal receives the first control instruction, the first detection parameter are obtained directly from the indication information of the first control instruction.

In a possible implementation, when the base station sends the first control instruction at block 401, the indication information is added in an information domain at a fixed position of the first control instruction; when the terminal receives the first control instruction, the indication information may be obtained in the information domain at the fixed position of the first control instruction. The bit length of the indication information is fixed or determined by configuration.

In another possible implementation, if the base station sends the control instruction to multiple terminals through the unlicensed channel, when the base station successfully occupies the unlicensed channel, the first control instruction is sent to multiple terminals.

Figure 5:
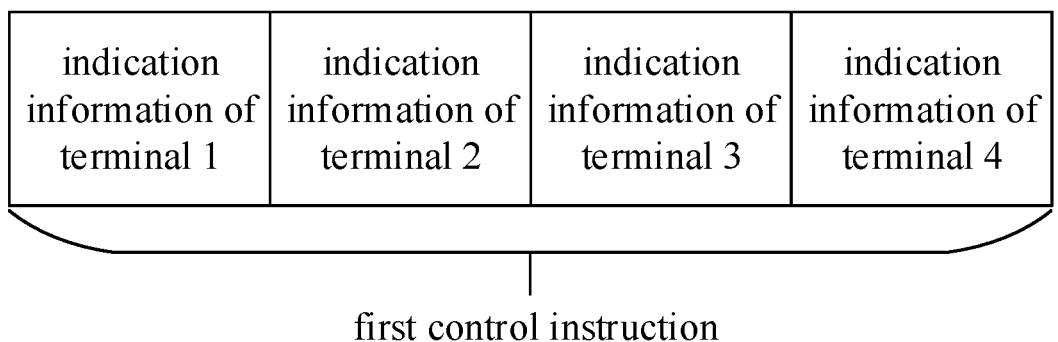
FIG. 5 is a diagram illustrating instruction information of multiple terminals according to an example embodiment.

At this time, the base station may solely send the first control instruction to each terminal, and each first control instruction carries the indication information of the corresponding terminal. Alternatively, as illustrated in FIG. 5, the base station may send only one first control instruction, the indication information of each terminal may be carried on multiple information domains of the first control instruction. Each terminal may detect the first control instruction, and obtain indication information from the information domain of the first control instruction. The indication information for each terminal is in the information domain at the fixed position of the first control instruction, and the bit length of indication information is fixed or determined by configuration. Alternatively, the base station may send only one first control instruction, the content of the first control instruction is consistent for each terminal, and the terminal obtains the indication information based on the indication in the first control signaling.

The indication information of different terminals may be the same or may be different, which depends on whether the detection parameters of the control instruction sent by the base station to multiple terminals through the unlicensed channel are the same.

In another possible implementation, before the terminal receives the first control instruction, the base station may send the second detection parameter to the terminal, the second detection parameter at least include the resource location for the base station sending the first control instruction. The terminal receives the second detection parameter and detects the first control instruction at resource location according to the second detection parameter. Therefore, the detection performed by the terminal may be adjusted by sending the second detection parameter, so that the terminal may detect the first control instruction according to the second detection parameter and obtain the situation of the base station occupying the unlicensed channel in time.

The second detection parameter may be configured to detect the first control instruction sent by the base station when the unlicensed channel is successfully occupied. In addition to the resource location, the second detection parameter further include at least one of an initial detection time point of the terminal, detection times, a detection cycle, a control instruction format or a polymerization level and other parameters, which will not be described in detail herein.

The base station may send the second detection parameter in advance to the terminal through signaling. Alternatively, the base station may not send the second detection parameters to the terminal through signaling, instead, the terminal defines the second detection parameter in advance. The embodiments of the present disclosure do not limit the way of the terminal determining the second detection parameter.

In another possible implementation, in order to facilitate different terminals to distinguish different first control instructions, the base station further determines the identification information of the first control instructions. The identification information is used to indicate the first control instruction. Only the terminal obtaining the identification information is allowed to receive the first control instruction, and the terminal not obtaining the identification information is not allowed to receive the first control instruction.

The base station determines one or more terminals receiving the second control instruction. Before the first control instruction is sent to the determined terminals, the identification information of the first control instruction is sent to the terminals, and received and stored by the terminals. When sending the first control instruction, the first control instruction carries the identification information. For each terminal, when receiving the first control instruction, the terminal doesn't parse the first control instruction immediately, but judge whether the identification information stored in the terminal matches the identification information carried in the first control instruction. When matched, the first control instruction is parsed to obtain the first detection parameter carried in the first control instruction. When not matched, the first control instruction is ignored, the first control instruction is no longer parsed and the first detection parameter carried in the first control instruction is not obtained.

The identification information may be represented by RNTI (Radio Network Temporary Identity). For example, the identification information of the first control instruction is 03A82F (represented by hexadecimal system). The base station sends identification information 03A82F of the first control instruction to terminal A and terminal B, but not to terminal C. When the base station sends the first control instruction that carries identification information 03A82F, terminal A and terminal B receive the first control instruction according to identification information 03A82F while terminal C no longer receives the first control instruction.

The base station sends the identification information to the terminal through the high layer signaling, the physical layer signaling, other signalings or other ways.

At block 404, the terminal detects the second control instruction according to the first detection parameter.

The first detection parameter at least includes the resource location on the unlicensed channel for the base station sending the control instruction, and the terminal detects the second control instruction at the resource location. In addition, the first detection parameter further includes the initial detection time point, a detection cycle, detection times of a time period of occupying the unlicensed channel, a control instruction format and a polymerization level, and the terminal may detect the second control instruction according to these parameters.

In a possible implementation, an effective time window may be set for the first detection parameter, the effective time window is configured to represent the validity of the first detection parameter, that is, the first detection parameter within the effective time window is valid while the first detection parameter at time point beyond the effective time window is invalid. Therefore, the terminal detects the second control instruction according to the first detection parameter within the effective time window of the first detection parameter.

The first control instruction may carry the effective time window, and the terminal may obtain the effective time window from the first control instruction after receiving the first control instruction. Alternatively, the effective time window may be determined by configuration, for example, the base station may detect the effective time window of the parameter for the terminal in advance, and the terminal directly obtains the effective time window by configuration.

With the method proposed in embodiments of the present disclosure, a first control instruction is sent to a terminal in response to an unlicensed channel being occupied successfully, in which the first control instruction carries indication information configured to indicate a first detection parameter. The base station sends a second control instruction, and the terminal may receive the first control instruction and determine the first detection parameter according to the indication information, and then adjust a detection manner according to the first detection parameter to detect the second control instruction. In embodiments of the present disclosure, when the base station successfully occupies the channel, the first control instruction may be sent to inform the terminal, and the terminal may be indicated to detect the control instruction sent through the unlicensed channel according to the first detection parameter, such that the terminal may obtain the situation of the base station occupying the unlicensed channel and conduct detection in time, and the base station may flexibly adjust the detection of the terminal according to the situation of terminal such as business situation when occupying the unlicensed channel, which ensures that the time period of the terminal detecting the control instruction is aligned with the time period of the base station occupying the unlicensed channel, thereby avoiding terminal control instruction failure due to the time period of the terminal detecting control instruction unaligned with the time period of the base station occupying the unlicensed channel or loss of the control instruction sent by the base station. Therefore, the problem that the terminal detect the control instruction is not suitable to the unlicensed channel may be solved, thereby enlarging the application range.

Figure 6:
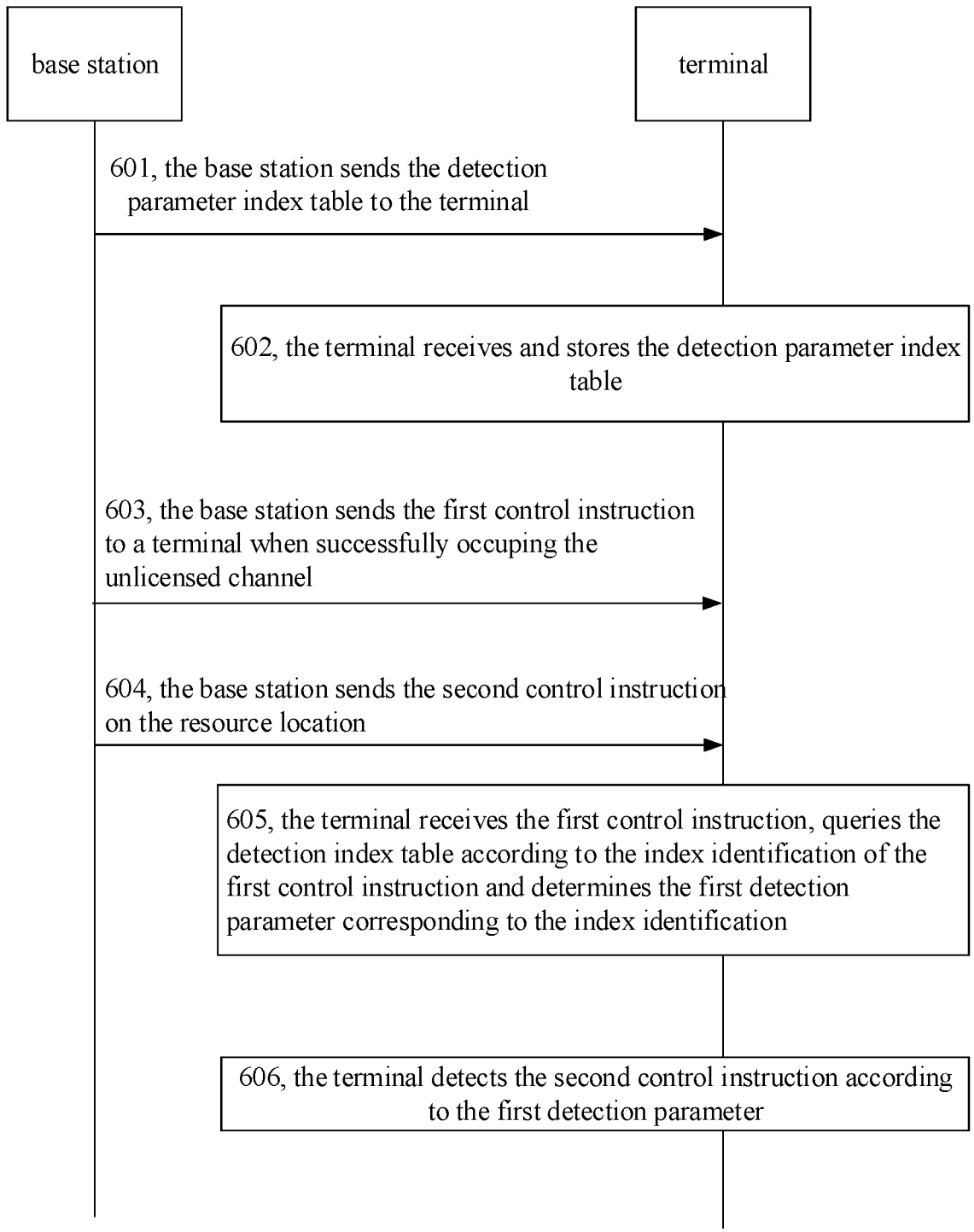
FIG. 6 is a flowchart illustrating a method for control instruction transmission according to an example embodiment.

FIG. 6 is a flowchart illustrating a method for control instruction transmission according to an example embodiment, interaction objects are a base station and a terminal. The embodiment is illustrated with an example of indication information as index identification. As illustrated in FIG. 6, the method includes followings.

At block 601, the base station sends the detection parameter index table to the terminal.

In embodiments of the present disclosure, the base station may create the detection parameter index table according to the multiple detection parameters which may be used in one or more terminals, and send the table to the one or more terminals. The detection parameter index table includes a detection parameter corresponding to each index identification, and way of determining each detection parameter is similar to the way of determining the first detection parameter at block 401, which will not be described in detail herein.

Different index identifications correspond to different detection parameters. For each terminal, the detection parameter index table may be queried and the detection parameter corresponding to index identification may be determined when the index identification is determined, such that the control instruction may be determined according to the determined detection parameter.

For example, the detection parameter index table may be shown in Table 1 as below. If index identification is 1, the corresponding detection parameter is detection parameter 1.

TABLE 1

| index identification | detection parameter |
|---|---|
| 1 | detection parameter 1 |
| 2 | detection parameter 2 |
| 3 | detection parameter 3 |

In a possible implementation, the base station may send the detection parameter index table to the terminal through high layer signaling or physical layer signaling.

For example, the base station may create a detection parameter index table for all terminals and send the table to each terminal, so that each terminal may determine the detection parameter according to the index identification. Alternatively, the base station may create a detection parameter index table for each terminal separately according to detection parameters each terminal may adopt, and send the detection parameter index table to the corresponding terminal, so that each terminal may determine the detection parameter to be adopted according to the index identification. In detection parameter index tables of different terminals, the number of detection parameters and detailed parameters configured in each detection parameter may be the same or different.

At block 602, the terminal receives and stores the detection parameter index table.

It should be noted that, the embodiments of the present disclosure merely take the base station creating and sending the detection parameter index table to the terminal as an example. In fact, acts in the above blocks 601 and 602 are optional steps. In another embodiment, the detection parameter index table may be predefined in an agreement between the base station and the terminal, and no need to be sent by the base station to the terminal.

At block 603, a first control instruction is sent to a terminal in response to the base station successfully occupying the unlicensed channel, in which the first control instruction carries indication information.

The block 603 is similar to the above block 401. The only difference lies in: the embodiments of the present disclosure take the indication information carried by the first control instruction being the index identification as an example, and subsequently the terminal may determine the corresponding first detection parameter according to the index identification.

When the base station sends the same detection parameter index table to multiple terminals, the base station may determine the same index identification for different terminals so as to determine the same detection parameter for different terminals; alternatively, the base station may determine different index identifications for different terminals so as to determine different detection parameters for different terminals.

At block 604, the base station sends the second control instruction on the resource location.

The block 604 is similar to the above block 402, which will not be described in detail herein.

At block 605, the terminal receives the first control instruction, queries the detection parameter index table according to the index identification in the first detection instruction, and determines the first detection parameter corresponding to the index identification.

After the terminal receives the first control instruction, the first control instruction carries indication information, the indication information is index identification. As the terminal has stored the detection parameter index table, the first detection parameter may be determined according to the detection parameter index table.

In a possible implementation, when the base station sends the first control instruction, index identification is added in the information domain at fixed position of the first control instruction. When the terminal receives the first control signaling, the index identification is obtained in the information domain at fixed position of the first control instruction, and the first detection parameter corresponding to the index identification may be determined. The bit length of index identification is fixed or determined according to the number of detection parameters configured in the detection parameter index table. For example, when four kinds of detection parameters and four corresponding index identifications are set in the detection parameter index table, the bit length of the index identification in the first control instruction is 2, that is, four different index identifications may be represented by 2 bits.

At block 606, the terminal detects the second control instruction according to the first detection parameter.

The block 606 is similar to the above block 404, which will not be described in detail herein.

With the method proposed in embodiments of the present disclosure, a first control instruction is sent to a terminal in response to an unlicensed channel being occupied successfully, in which the first control instruction carries indication information configured to indicate a first detection parameter. The base station sends a second control instruction, and the terminal may receive the first control instruction and determine the first detection parameter according to the indication information, and then adjust a detection manner according to the first detection parameter to detect the second control instruction. In embodiments of the present disclosure, when the base station successfully occupies the channel, the first control instruction may be sent to inform the terminal, and the terminal may be indicated to detect the control instruction sent through the unlicensed channel according to the first detection parameter, such that the terminal may obtain the situation of the base station occupying the unlicensed channel and conduct detection in time, and the base station may flexibly adjust the detection of the terminal according to the situation of terminal such as business situation when occupying the unlicensed channel, which ensures that the time period of the terminal detecting the control instruction is aligned with the time period of the base station occupying the unlicensed channel, thereby avoiding terminal control instruction failure due to the time period of the terminal detecting control instruction unaligned with the time period of the base station occupying the unlicensed channel or loss of the control instruction sent by the base station. Therefore, the problem that the terminal detect the control instruction is not suitable to the unlicensed channel may be solved, thereby enlarging the application range.

Furthermore, the base station sends the detection parameter index table to the terminal first. When sending the control instruction through the unlicensed channel, the first control instruction sent to the terminal by the base station may only carry the index identification without carrying the detection parameter, and the terminal determines the corresponding detection parameter according to index identification. Since the data volume of the index identification is smaller than the data volume of the detection parameter, the way of carrying the index identification reduces the data volume and saves network resources.

Figure 7:
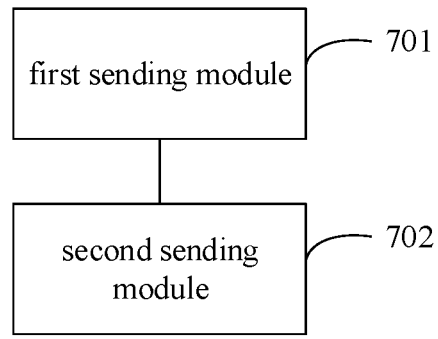
FIG. 7 is a block diagram illustrating a base station according to an example embodiment.

FIG. 7 is a block diagram illustrating a base station according to an example embodiment. As illustrated in FIG. 7, the base station includes a first sending module 701 and a second sending module 702.

The first sending module 701, is configured to send a first control instruction to a terminal in response to an unlicensed channel being occupied successfully, in which the first control instruction carries indication information configured to indicate a first detection parameter at least including a resource location on the unlicensed channel for the base station sending a control instruction.

The second sending module 702, is configured to send a second control instruction on the resource location.

In a possible implementation, the indication information is an index identification. The base station further includes: a third sending module, configured to send a detection parameter index table to the terminal, in which each index identification corresponds to a detection parameter in the detection parameter index table, and the detection parameter index table is configured to query the detection parameter corresponding to the index identifications.

In another possible implementation, the indication information includes the first detection parameter.

In another possible implementation, the indication information is in an information domain at a fixed position of the first control instruction, and a bit length of the indication information is fixed or determined by configuration.

In another implementation, an effective time window of the first detection parameter is carried in the first control instruction or determined by configuration.

In another possible implementation, the base station further includes: a fourth sending module, configured to send identification information of the first control instruction to the terminal.

In another possible implementation, the base station further includes: a fifth sending module, configured to send a second detection parameter to the terminal, in which the second detection parameter at least includes a resource location for the base station sending the first control instruction.

In another possible implementation way, the base station further includes: a receiving module, configured to receive a detectability of the terminal; and a determining module, configured to determine the first detection parameter according to the detectability of the terminal, in which the first detection parameter includes at least one of the resource location, an initial detection time point, a detection cycle, detection times of a time period of occupying the unlicensed channel, a control instruction format and a polymerization level.

The first sending module, the second sending module, the third sending module, the fourth sending module and the fifth sending module may be the same sending module or may be different sending modules.

It should be noted that, when the base station provided in the above embodiments transmits control instructions, the division of the above function modules is given merely as an example. In practical applications, the above functional allocation may be completed by different function modules according to requirements, that is, the internal structure of the base station is divided into different function modules to complete all or part of the functions described above. In addition, embodiments of the detection methods for the base station and the control instruction in the above embodiments belong to the same concept. For the detailed implementation process, please refer to embodiments of the method, which will not be described in detail herein.

Figure 8:
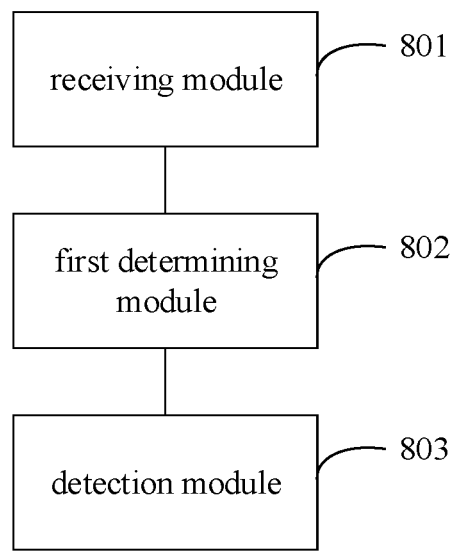
FIG. 8 is a block diagram illustrating a terminal according to an example embodiment.

FIG. 8 is a block diagram illustrating a terminal according to an example embodiment. As illustrated in FIG. 8, the terminal includes a receiving module 801, a first determining module 802 and a detection module 803.

The receiving module 801 is configured to receive a first control instruction sent by a base station in response to an unlicensed channel being occupied successfully, in which the first control instruction carries indication information configured to indicate a first detection parameter, the first detection parameters at least includes a resource location on the unlicensed channel for the base station sending a control instruction.

The first determining module 802 is configured to determine the first detection parameter according to the indication information.

The detection module 803 is configured to detect a second control instruction sent by the base station on the resource location according to the first detection parameter.

In a possible implementation, the indication information is an index identification, and the first determining module is configured to query a detection parameter index table according to the index identification, and to determine the first detection parameter corresponding to the index identification, in which each index identification corresponds to a detection parameter in the detection parameter index table.

In another possible implementation, the indication information includes the first detection parameter and the first determining module is configured to determine the first detection parameter included in the indication information.

In another possible implementation, the indication information is in an information domain at a fixed position of the first control instruction, and a bit length of indication information is fixed or determined by configuration.

In another possible implementation, an effective time window of the first detection parameter is carried in the first control instruction or determined by configuration, and the detection module 803 is configured to detect the second control instruction according to the first detection parameter in the effective time window of the first detection parameter.

In another possible implementation, the receiving module 801 is configured to determine the first detection parameter according to the indication information in response to identification information carried in the first control instruction matched with a stored identification information.

In another possible implementation, the terminal includes: a second determining module, configured to determine a second detection parameter, in which the second detection parameter at least include a resource location of the first control instruction sent by the base station; in which the detection module 803 is further configured to detect the first control instruction according to the second detection parameter.

In another possible implementation, the terminal includes: a sending module, configured to send a detectability of the terminal to the base station, in which the detectability is configured to determine the first detection parameter.

It should be noted that, when the terminal provided in the above embodiments transmits control instructions, the division of the above function modules is given merely as an example. In practical applications, the above functional allocation may be completed by different function modules according to requirements, that is, the internal structure of the terminal is divided into different function modules to complete all or part of functions described above. In addition, embodiments of the detection methods for the base station and the control instruction in the above embodiments belong to the same concept. For the detailed implementation process, please refer to embodiments of the method, which will not be described in detail herein.

Figure 9:
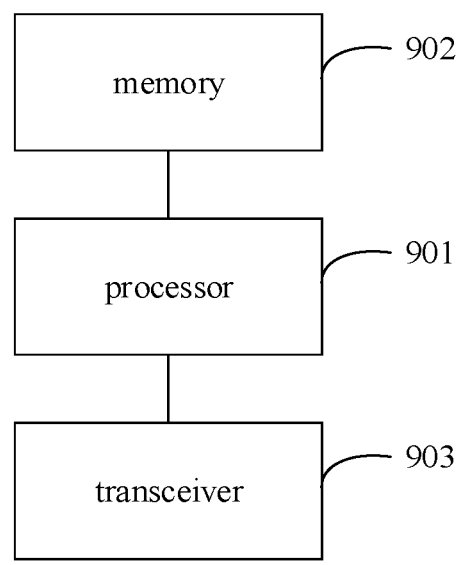
FIG. 9 is a block diagram illustrating a base station according to an example embodiment.

FIG. 9 is a block diagram illustrating a base station according to an example embodiment. As illustrated in FIG. 9, the base station includes a processor 901, a processor 902 configured to store instructions executable and a transceiver 903. The processor 901 is configured to: send a first control instruction to a terminal via the transceiver 903 in response to an unlicensed channel being occupied successfully, in which the first control instruction carries indication information configured to indicate a first detection parameter at least including a resource location on the unlicensed channel for the base station sending a control instruction; and send a second control instruction on the resource location via the transceiver 903.

A computer readable storage medium is further provided. When instructions stored on the computer readable storage medium is performed by a processor of a base station, the base station is caused to perform the method for control instruction transmission in the above embodiments.

Figure 10:
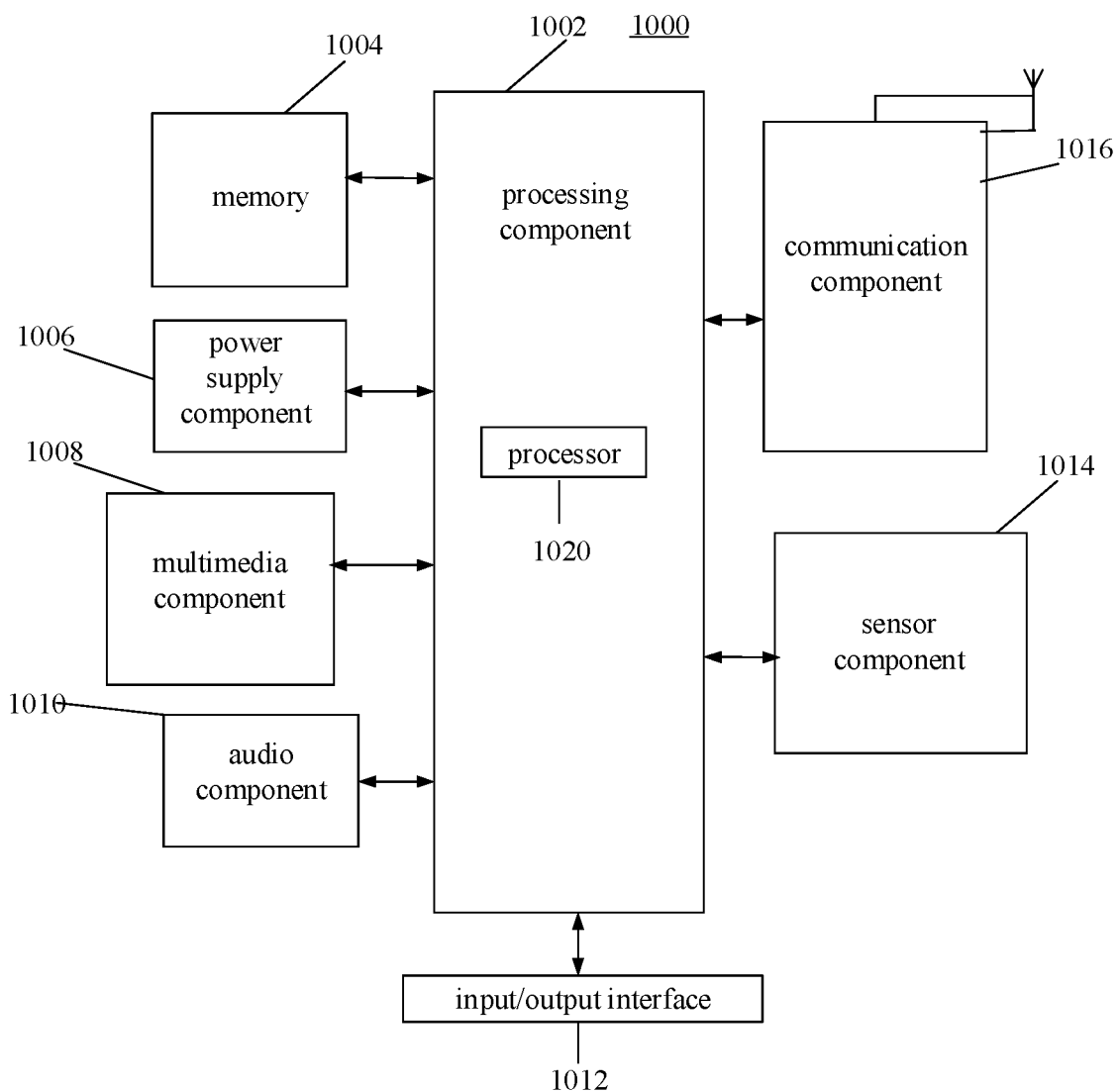
FIG. 10 is a block diagram illustrating a terminal according to an example embodiment.

FIG. 10 is a block diagram illustrating a terminal 1000 according to an example embodiment. For example, the terminal 1000 may be a mobile phone, a computer, a digital broadcasting device, a messaging device, a game console, a tablet device, a medical equipment, a fitness equipment, a personal digital assistant, etc.

As illustrated in FIG. 10, the terminal 1000 may include one or more components of: a processing component 1002, memory 1004, a power supply component 1006, a multimedia component 1008, an audio component 1010, an input/output (I/O) interface 1012, a sensor component 1014, and a communication component 1016.

The processing component 1002 generally controls an overall operation of the terminal 1000, such as the operations related to display, phone call, data communication, camera operation and recording operation. The processing component may include one or more processors 1020 to perform instruction, to complete all or part of steps of the above method. In addition, the processing component 1002 may include one or more modules for the convenience of interaction between the processing component 1002 and other units. For example, the processing component 1002 may include the multimedia module for the convenience of interaction between the multimedia component 1008 and the processing component 1002.

The memory 1004 is configured to store all types of data to support the operation of terminal 1000. Examples of the data include the instructions of any applications or methods operated on terminal 1000, contact data, phone book data, messages, pictures, videos, etc. The memory 1004 may be implemented by any type of volatile or non-volatile storage devices or their combination, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic Disk or Optical Disk.

The power supply component 1006 may provide power supply for all components of the terminal 1000. The power supply component 1006 may include power supply management system, one or more power supplies, and other components related to generating, managing and distributing power for the terminal 1000.

The multimedia component 1008 includes an output interface screen provided between the terminal 1000 and the user. In some embodiments, the screen may include Liquid Crystal Display (LCD) and Touch Panel (TP). If the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 1008 include a front camera and/or a rear camera. When the terminal 1000 is in operation mode, such as shooting mode or video mode, the front camera or the rear camera may receive the external multimedia data. Each front camera and rear camera may be a fixed optical lens system or an optical lens system with focal length and optical zoom capacity.

The audio component 1010 is configured as output and/or input signal. For example, the audio component 1010 includes a microphone (MIC). When the terminal 1000 is in operation mode, such as call mode, record mode, and speech recognition mode, the microphone is configured to receive the external audio signals. The audio signals received may be stored in the memory 1004 or sent through the communication component 1016. In some embodiments, the audio component 1010 further includes a speaker, configured to output audio signals.

I/O interface 1012 provides an interface for the processing component 1002 and the peripheral interface module, the peripheral interface module may be a keyboard, click wheel, a button, etc. The buttons may include but not limited to home button, volume button, start button and lock button.

The sensor component 1014 includes one or more sensors, configured to provide various aspects of status assessment for the terminal 1000. For example, the sensor component 1014 may detect the on/off state of the terminal 1000 and the relative positioning of the units. For example, the component may be a display and a keypad of the terminal 1000, the sensor component 1014 may also detect the location change of the terminal 1000 or a component of the terminal 1000, the presence or absence of contact between the user and the terminal 1000, the orientation or acceleration/deceleration of the terminal 1000, and the temperature change of the terminal 1000. The sensor component 1014 may include a proximity sensor, configured to detect the existence of the objects nearby without any physical contact. The sensor component 1014 may include a light sensor such as CMOS or CCD image sensor, configured to use in imaging applications. In some embodiments, the sensor component 1014 may further include an acceleration transducer, a gyroscope sensor, a magnetic sensor, a pressure sensor or a temperature sensor.

The communication component 1016 is configured for the convenience of wire or wireless communication between the terminal 1000 and other devices. The terminal 1000 may access wireless networks based on communication standards, such as Wi-Fi, 2G or 3G, or their combination. In an exemplary embodiment, the communication component 1016 receives broadcast signals or broadcast-related information from an external broadcast management system via a broadcast channel. In an exemplary embodiment, the communication component 1016 further includes a near field communication (NFC) module to facilitate short-range communication.

In an exemplary embodiment, the terminal 1000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, configured to perform the above detection method of control instruction.

In an exemplary embodiment, a non-temporary computer readable storage medium is provided which includes instructions, such as the memory 1004 including instructions, the instructions may be performed by the processor 1020 of the terminal 1000 to complete the above method. For example, the non-temporary computer readable storage medium may be a ROM, a random access memory (RAM), a CD-ROM, a magnetic tape, a floppy disk, an optical data storage device, etc.

A computer readable storage medium is further provided. When instructions in the computer readable storage medium are performed by a processor of a terminal, the terminal may be caused to perform the method in the above embodiments. The method includes: receiving a first control instruction sent by a base station in response to an unlicensed channel being occupied successfully, in which the first control instruction carries indication information configured to indicate a first detection parameter, the first detection parameters at least includes a resource location on the unlicensed channel for the base station sending a control instruction; determining the first detection parameter according to the indication information; and detecting a second control instruction sent by the base station on the resource location according to the first detection parameter.

The skilled in the art may understand that all or a part of the steps in the above embodiments may be implemented by hardware, or by a program to instruct relevant hardware, the program may be stored in a computer readable storage medium such as a read-only memory, a magnetic disk or an optical disk, etc.

The above are merely some optional embodiments in embodiments of the present disclosure, and do not constitute the limitation of the present disclosure. Any modification, equivalent replacement, improvement, etc., made within the spirit and principle of embodiments of the present disclosure shall be included within the protection scope of embodiments of the present disclosure.

What is claimed is:

1. A method for control instruction transmission, applied to a base station, comprising:
sending a first control instruction to user equipment (UE) in response to an unlicensed channel being occupied successfully, wherein the first control instruction carries indication information configured to indicate a first detection parameter that at least comprises a resource location on the unlicensed channel for the base station sending a control instruction; and
sending a second control instruction on the resource location;
wherein the indication information is an index identification, and the method further comprises:
sending a detection parameter index table to the UE, wherein each index identification corresponds to a detection parameter in the detection parameter index table, and the detection parameter index table is configured to query the detection parameter corresponding to the index identification.

2. The method of claim 1, wherein the indication information comprises the first detection parameter.

3. The method of claim 1, wherein the indication information is in an information domain at a fixed position of the first control instruction, and a bit length of the indication information is fixed or determined by configuration.

4. The method of claim 1, wherein an effective time window of the first detection parameter is carried in the first control instruction or determined by configuration.

5. The method of claim 1, further comprising:
sending identification information of the first control instruction to the terminal.

6. The method of claim 1, further comprising:
sending a second detection parameter to the UE, wherein the second detection parameter at least comprises a resource location for the base station sending the first control instruction.

7. The method of claim 1, further comprising:
receiving a detectability of the UE; and
determining the first detection parameter according to the detectability of the UE, wherein the first detection parameter comprises at least one of the resource location, an initial detection time point, a detection cycle, detection times of a time period of occupying the unlicensed channel, a control instruction format and a polymerization level.

8. A method for control instruction transmission, applied to user equipment (UE), comprising:
receiving a first control instruction sent by a base station in response to an unlicensed channel being occupied successfully, wherein the first control instruction carries indication information configured to indicate a first detection parameter, the first detection parameter at least comprises a resource location on the unlicensed channel for the base station sending a control instruction;
determining the first detection parameter according to the indication information; and
detecting a second control instruction sent by the base station on the resource location according to the first detection parameter;
wherein the indication information is an index identification and determining the first detection parameter according to the indication information comprises:
querying a detection parameter index table according to the index identification, and determining the first detection parameter corresponding to the index identification, wherein each index identification corresponds to a detection parameter in the detection parameter index table.

9. The method of claim 8, wherein the indication information comprises the first detection parameter, and determining the first detection parameter according to the indication information comprises:
determining the first detection parameter comprised in the indication information.

10. The method of claim 8, wherein the indication information is in an information domain at a fixed position of the first control instruction, and a bit length of indication information is fixed or determined by configuration.

11. The method of claim 8, wherein an effective time window of the first detection parameter is carried in the first control instruction or determined by configuration; and
detecting the second control instruction sent by the base station on the resource location according to the first detection parameter comprises:
detecting the second control instruction according to the first detection parameter within the effective time window of the first detection parameter.

12. The method of claim 8, wherein determining the first indication parameter according to the indication information comprises:
determining the first detection parameter according to the indication information in response to identification information carried in the first control instruction matched with a stored identification information.

13. The method of claim 8, wherein receiving the first control instruction sent by the base station in response to the unlicensed channel being occupied successfully comprises:
determining a second detection parameter, wherein the second detection parameter at least include a resource location of the first control instruction sent by the base station;
detecting the first control instruction according to the second detection parameter.

14. The method of claim 8, further comprising:
sending a detectability of the terminal to the base station, wherein the detectability is configured to determine the first detection parameter.

15. A base station implementing the method of claim 1, comprising:
a processor;
memory configured to store instructions executable by the processor;
wherein, the processor is configured to perform steps of the method.

16. User equipment (UE), comprising:
a processor;
memory configured to store instructions executable by the processor;
wherein, the processor is configured to:
receive a first control instruction sent by a base station in response to an unlicensed channel being occupied successfully, wherein the first control instruction carries indication information configured to indicate a first detection parameter that at least comprises a resource location on the unlicensed channel for the base station sending a control instruction;
determine the first detection parameter according to the indication information; and
detect a second control instruction sent by the base station on the resource location according to the first detection parameter;
wherein the indication information is an index identification, and determining the first detection parameter according to the indication information comprises:
querying a detection parameter index table according to the index identification, and determining the first detection parameter corresponding to the index identification, wherein each index identification corresponds to a detection parameter in the detection parameter index table.

17. A non-transitory computer-readable storage medium having at least one instruction stored thereon for execution by a processor to implement operations of the method of claim 1.

18. A non-transitory computer-readable storage medium having at least one instruction stored thereon for execution by a processor to implement operations of the method of claim 8.

* * * * *